Patented July 18, 1950

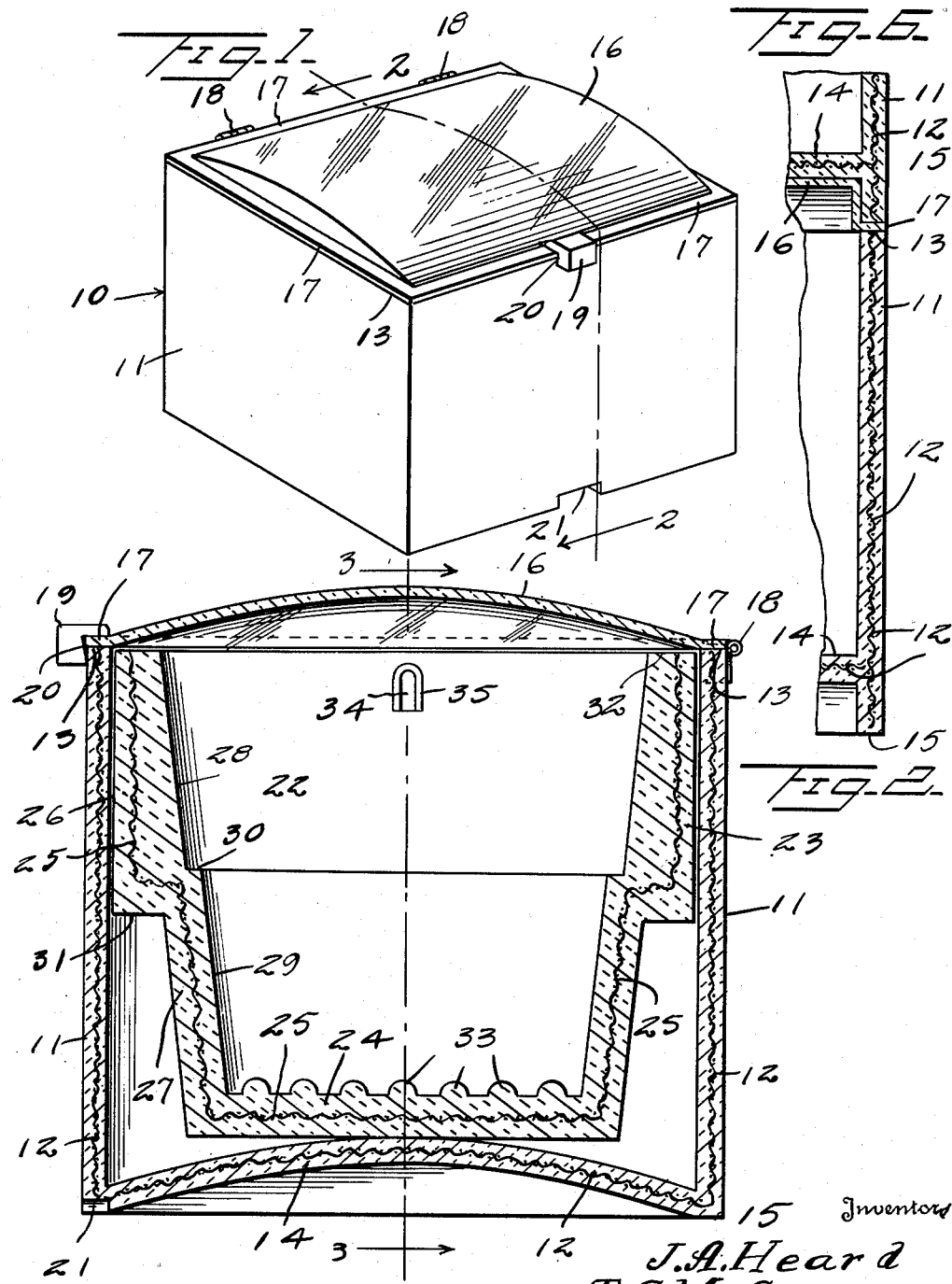
July 18, 1950  J. A. HEARD ET AL  2,515,709
SERVING DEVICE HAVING REMOVABLE INNER RECEPTACLE
Filed Feb. 27, 1948  2 Sheets-Sheet 1
Inventors
J. A. Heard
T. C. McCourry
By
Kimmel & Crowell Attys.

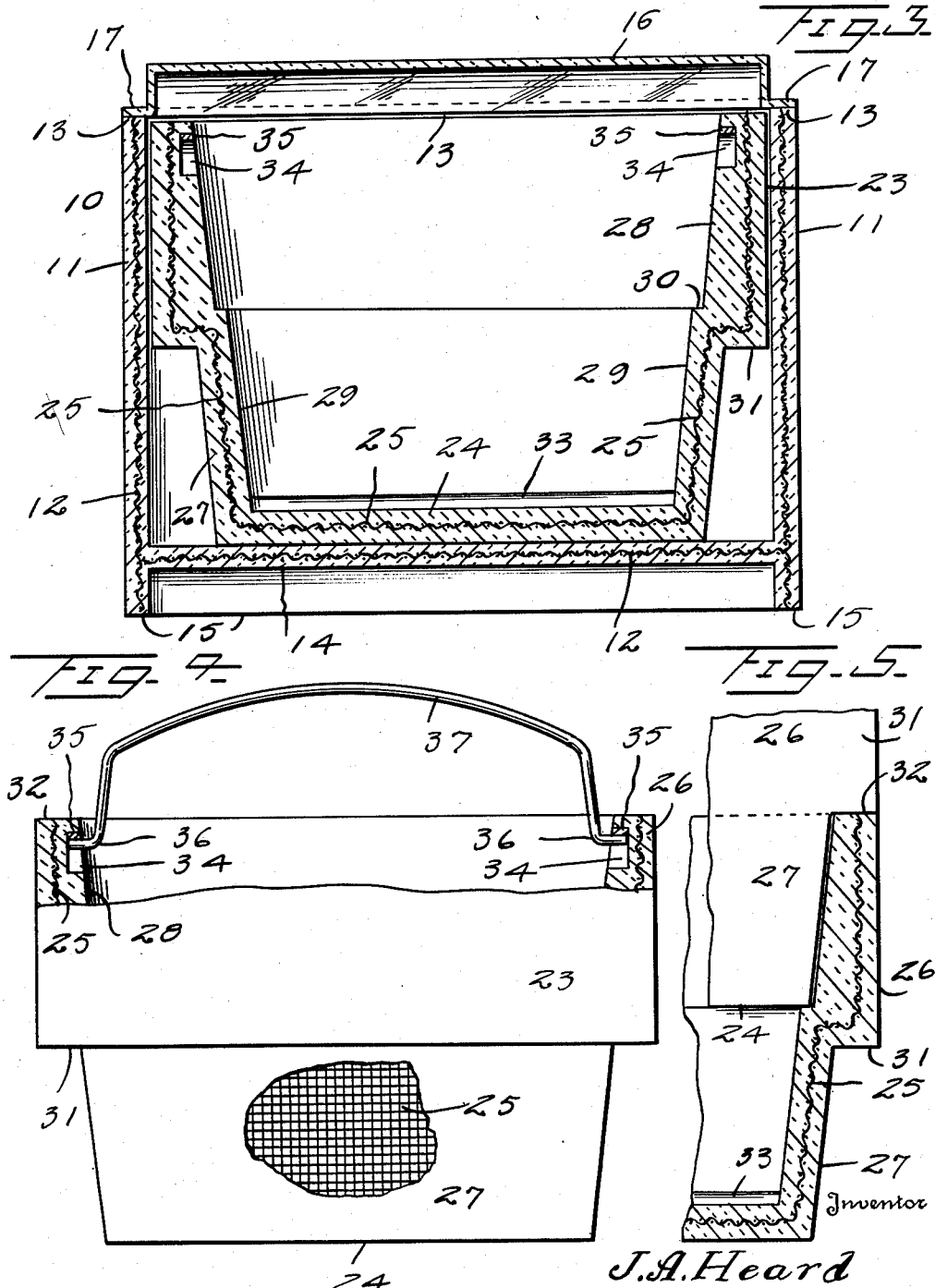

2,515,709

UNITED STATES PATENT OFFICE 2,515,709

SERVING DEVICE HAVING REMOVABLE INNER RECEPTACLE

John A. Heard and Thomas C. McCourry, Oklahoma City, Okla.

Application February 27, 1948, Serial No. 11,516

1 Claim. (Cl. 220—17)

Our invention relates to a serving device, bichest or case embodying outer and inner receptacles whereby food which is either hot, warm, chilled or cold, may be placed therein before or after being heated or chilled, the food being placed in the inner receptacle of the device after being heated in an oven or elsewhere or chilled in a refrigerator and the device placed on a dining or serving table or other convenient place for access to and serving of the food, and is not an oven or a freezer.

An object of the invention is to provide a serving device of the character stated embodying inner and outer receptacles, the inner receptacle being received in the outer receptacle, shell or housing which has a cover or lid and the receptacles being of heat or cold retaining material or insulation and constructed to maintain the food hot or cold for a considerable time for service.

Another object is to provide a serving device of the character stated having an outer shell or housing and an inner food containing bowl or receptacle designed for serving purposes only, that is not an oven or for cooking the food and having novel means whereby both the outer and inner receptacles or containers may be independently or jointly, that is separately or with the inner container assembled in the outer container, nested, fitted or stacked one within another for convenient compact storage and shipment.

A further object is to so construct the outer receptacle that the same has a transparent window or top cover through which the food is visible, and in which the surrounding top edge or rim of the outer receptacle is provided with a flat seat on which the cover or lid rests, the cover projecting upwardly in the central area in a convex arc but provided with a surrounding flat rim on which the surrounding edge at the bottom of another receptacle fits or rests, while the bottom is raised convexly to accommodate the cover with or without direct contact therewith to permit the outer receptacles with or without the inner receptacles therein to be nested or compactly stacked and remain in such position.

A further object is to provide means for conveniently opening the cover or holding the same closed tight, said means being accommodated in a seat in the bottom of an outer receptacle nested or stacked thereon.

A still further object is to provide a means or handle adapted to be associated with the inside of the inner receptacle to facilitate lifting thereof and placing the same in the outer receptacle or removing the same from an oven or refrigerator and inserting it in the outer receptacle while hot or cold without exposure to contact with the hands, to facilitate serving the food.

Another object is to provide means at the bottom of the inner receptacle for supporting the food in a raised position spaced from the bottom thereof to allow circulation of air and collection of moisture to prevent the same from coming in contact with the food so that the latter will not become moist or soggy and may be maintained in a delectable condition to contribute to making a good meal a better meal.

With the above and other objects in view, our invention consists in the arrangement, combination and details of construction disclosed in the drawings and specification, and then more particularly pointed out in the appended claim.

In the drawings,

Figure 1 is a perspective view of a serving device embodying our invention,

Figure 2 is an enlarged sectional view taken on the line 2—2 of Figure 1,

Figure 3 is a sectional view taken on the line 3—3 of Figure 2,

Figure 4 is an elevation partly broken away and in section of the inner receptacle with the handle associated therewith, Figure 5 is a fragmentary sectional view showing the manner of stacking the inner receptacles; and Figure 6 is a fragmentary sectional view showing the manner of stacking the outer receptacles with or without the inner receptacles therein.

Referring to the drawings, the serving device is indicated generally at 10 and comprises an outer receptacle, shell or housing 11 of any suitable geometrical shape but illustrated as rectangular or square having four surrounding vertical walls which may be of vari-colored hot or cold insulation such as molded asbestos or other suitable material such as plastic, synthetic resin, a phenol condensation product or otherwise so as to retain heat or cold and reinforced if desired with a copper or other good heat conducting wire mesh 12 for absorbing and retaining heat imbedded in the walls thereof. The receptacle is provided at the top with a surrounding flat rim or seat 13 and with a raised bottom 14 shown as concavo-convex or arched upwardly such as from the bottom edges of the front and back walls so as to be raised above the bottom edges of the side walls but provided with a surrounding flat bottom edge or rim 15. The reinforcing and the heat conducting wire mesh 12 is also shown imbedded in the bottom wall 14.

A similarly formed raised or concavo-convex cover or lid 16 is provided for the outer receptacle or shell 11, shaped like the bottom portion and preferably formed of transparent or clear plastic or similar material and may be varicolored. The cover 16 is provided with a surrounding flat marginal portion or rim 17 adapted to seat flat upon the rim or edge 13 of the receptacle 11 and may be suitably associated therewith as by means of hinges 18 along one side. The opposite side is provided with an integral or attached handle 19 shown recessed and provided at the center thereof with a depending outer portion having a beveled inner face 20 adapted to frictionally engage over the front face of the receptacle to form a friction catch to hold the cover in a closed position. Directly beneath the handle 19, the wall of the receptacle 11 at its bottom edge 15 may be provided with a central recess or seat 21 to accommodate the catch or handle when the outer receptacles are nested one within the other in the manner shown in Figure 6 of the drawings, for compact storage or shipment. In this figure it will be noted that the bottom edge 15 rests directly upon the top surface of the rim 17 and the bottom surface of the latter upon the rim edge 13 with the covers 16 extending into the recessed bottoms formed by the raised bottom walls 14, so as to retain all of the nested receptacles in stacked position without becoming displaced one with respect to the other.

The inner receptacles or containers for the food are indicated at 22 and are somewhat in the form of a bowl produced from molded heat or cold insulation such as asbestos or similar material of which the outer receptacle 11 is described as being formed. The inner receptacle is preferably provided with an upper portion 23 of uniform size conforming to the shape and interior size of the outer receptacle and depending upon the geometrical shape of the outer receptacle with which it corresponds and in the present instance rectangular or square. The bottom wall of the receptacle is indicated at 24 and is shown as flat to rest upon the top surface of the bottom 14 of the outer receptacle 11, and the walls of the inner receptacle are similarly reinforced with copper or other wire mesh 25. The outer surface 26 of the upper portion 23 is shown vertical or of uniform contour and the lower portion 27 tapers downwardly, while the inner surface 28 of the upper portion is also tapered downwardly, as is the inner surface of the lower portion 27 as indicated at 29. However, the inner surface 29 is offset inwardly from the upper surface 28 to form an upwardly facing surrounding shoulder or seat 30 on which the bottom face of the bottom wall 24 is adapted to seat when the inner receptacles are nested or stacked one upon the other in the manner shown in Figure 5 of the drawings. The lower portion 27 at its juncture with the upper portion 23 by reason of the uniform outer wall surface 26, forms a wider but downwardly facing shoulder or seat 31 externally of the lower portion 27 as distinct from the upwardly facing seat or shoulder at the inside, the shoulder 31 being designed to rest upon the top edge or rim 32 of the inner receptacles or to be spaced therefrom to facilitate lifting the receptacles one from the other when so assembled in nested or stacked relation as seen in Figure 5. In other words, the rim 32 may be engaged by the shoulder 31 or have any desired spacing therebetween so that the fingers may be inserted in lifting the inner receptacles from their stacked positions.

The bottom 24 of the inner receptacle is provided with means to support the food in spaced relation to the top surface of the bottom 24 in order that when food is placed thereon, air may circulate beneath the food and moisture therefrom will be prevented from coming in contact with the food to cause the same to assume a soggy or wet condition. This means is shown as a plurality of spaced parallel ribs 33 illustrated as convex. It may also be mentioned that the wire mesh 25 extends continuously through the bottom wall 24 and is cast or molded therein the same as the wire mesh 12 is cast in the surrounding wall and bottom of the outer receptacle 11. Also, it will be observed that the handle 19 of one receptacle will be received within the recess or seat 21 of a receptacle placed thereon when in nested or stacked position.

As a facility in placing the inner receptacle in an oven or refrigerator, and lifting the same when hot or cold to deposit it in the outer receptacle the inner receptacle is formed at opposite sides with vertical recesses or seats 34 which may be reinforced with a metallic or other wall 35 shown as inverted U-shaped. These recesses or seats are adapted to receive the oppositely extending horizontal ends 36 of a handle or bail 37 of suitable stout resilient wire or the like so as to be readily engageable and disengageable with respect thereto, as it is thought will be apparent from the showing in Figures 2 and 4 of the drawings. In this way contact of the hands with the hot or cold receptacle or burning of the hands will be prevented.

In the use of the device, the inner receptacle with the food therein may be placed in the outer receptacle for serving the food and maintaining the same in the desired condition, either hot or cold if placed therein in such condition. However, the food may be placed in the inner receptacle after being heated in an oven or chilled in a refrigerator and then placed in the outer receptacle for serving the food, where it may be maintained in the desired condition by closing the cover 16 and conveniently served by simply opening the cover. Thus, the device may not only be used for serving hot food including bread products, but may also be used for serving cold food such as salads, ices, puddings and the like.

We do not mean to confine ourselves to the exact details of construction herein disclosed but claim all variations falling within the purview of the appended claim.

What we claim is:

A serving device comprising an outer receptacle having vertically disposed side walls, an inner receptacle including an upper portion formed with a vertical external surface adapted to be received within said side walls and a downwardly converging inner surface, a lower portion formed with downwardly converging inner and outer surfaces, an external downwardly facing seat and an internal upwardly facing seat joining said upper and lower portions, said upper portion inner surface being adapted to receive the lower portion outer surface of another like receptacle, said internal seat being adapted to engage the bottom of the lower portion of another like receptacle, and said external seat being adapted to engage the top of the upper portion of another like receptacle when said inner receptacles are nested one within the other.

JOHN A. HEARD.
THOMAS C. McCOURRY.

REFERENCES CITED

The following references are of record in the file of this patent:

UNITED STATES PATENTS

| Number | Name | Date |
|---|---|---|
| 797,314 | Owens | Aug. 15, 1905 |
| 1,216,031 | Wilcox | Feb. 13, 1917 |
| 1,300,712 | Ferdon | Apr. 15, 1919 |
| 1,497,159 | Porter | June 10, 1924 |
| 1,662,605 | Hall | Mar. 13, 1928 |
| 1,693,251 | Pick | Nov. 27, 1928 |
| 1,908,806 | Allen | May 16, 1933 |
| 1,949,453 | Crimmel et al. | Mar. 6, 1934 |
| 1,956,395 | Montgomery | Apr. 24, 1934 |
| 2,312,293 | Weiss | Feb. 23, 1943 |
| 2,342,477 | Magnenot | Feb. 22, 1944 |
| 2,342,486 | Poglein | Feb. 22, 1944 |
| 2,350,463 | Kallus | June 6, 1944 |
| 2,436,097 | Clarke | Feb. 17, 1948 |

FOREIGN PATENTS

| Number | Country | Date |
|---|---|---|
| 798,818 | France | Mar. 11, 1936 |